J. C. RINGE.
SEWING MACHINE.
APPLICATION FILED SEPT. 19, 1911.
1,100,913.
Patented June 23, 1914.
7 SHEETS—SHEET 3.
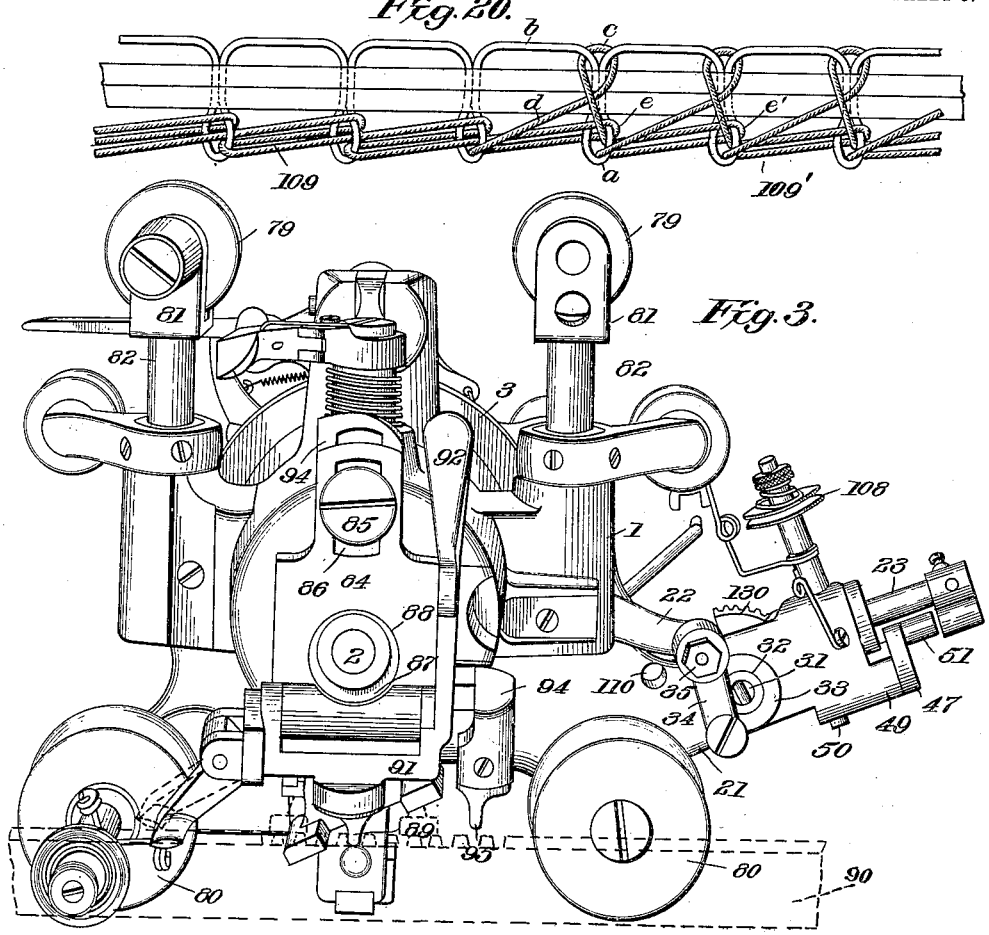
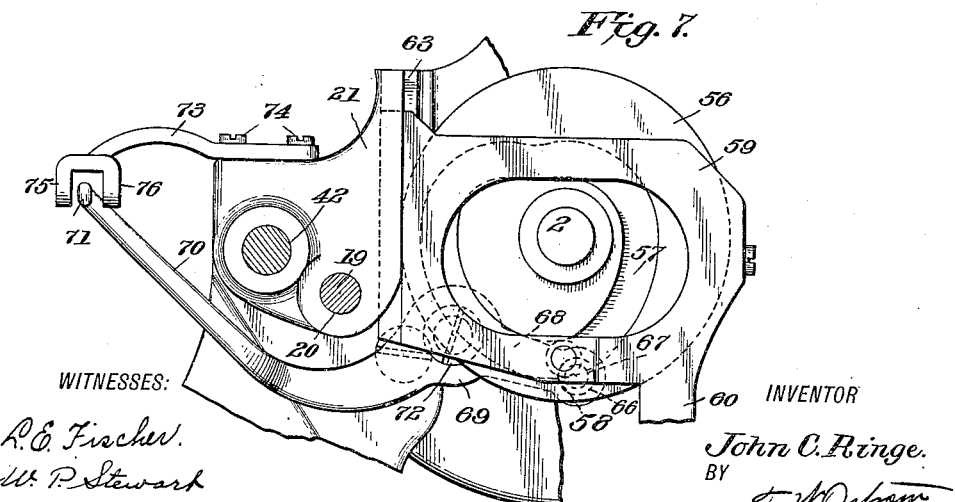
WITNESSES:
L. E. Fischer.
W. P. Stewart.
INVENTOR
John C. Ringe.
BY
F. N. Ostrom,
ATTORNEY J. C. RINGE.
SEWING MACHINE.
APPLICATION FILED SEPT. 19, 1911.
1,100,913.
Patented June 23, 1914.
7 SHEETS—SHEET 4.
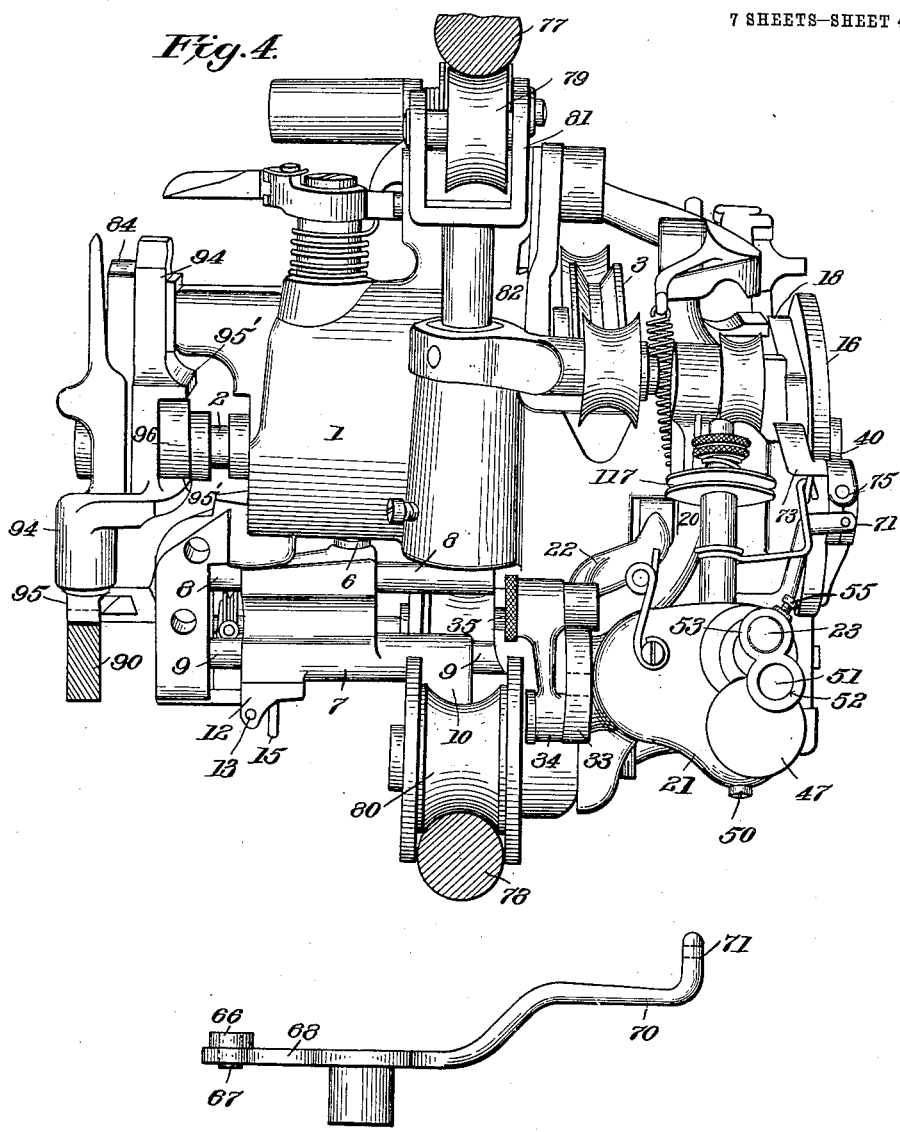
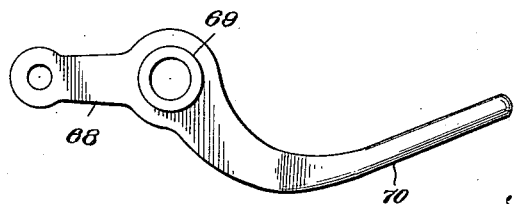
WITNESSES:
R. E. Fischer.
W. P. Stewart.
INVENTOR
John C. Ringe.
BY
F. H. Oehmen
ATTORNEY J. C. RINGE.
SEWING MACHINE.
APPLICATION FILED SEPT. 19, 1911.
1,100,913.
Patented June 23, 1914.
7 SHEETS—SHEET 5.
Fig. 5.
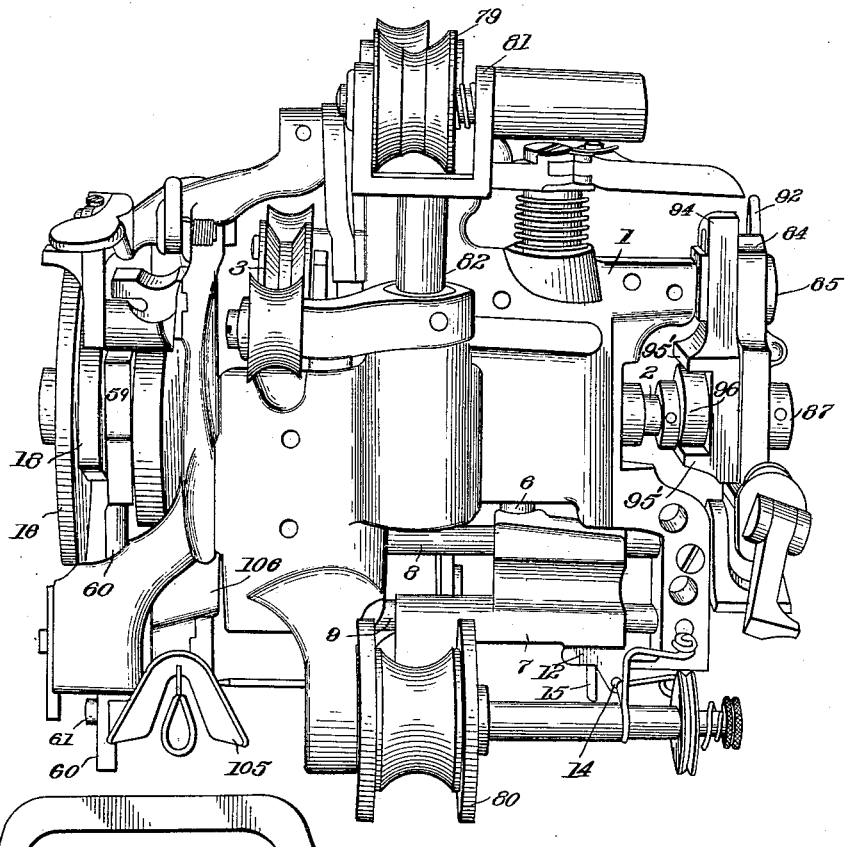
Fig. 11.
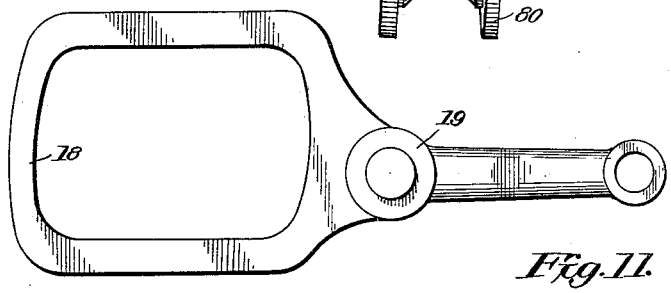
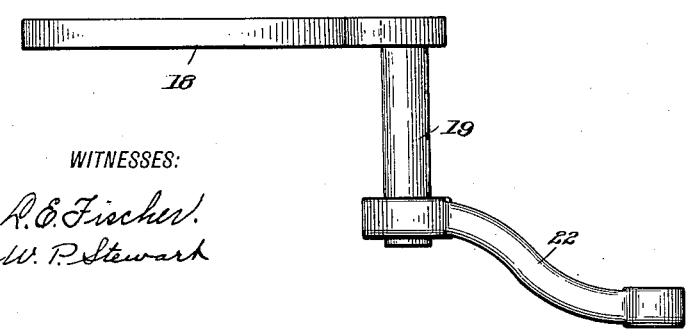
WITNESSES:
R. E. Fischer
W. P. Stewart
INVENTOR
John C. Ringe,
BY
F. W. Osborn
ATTORNEY

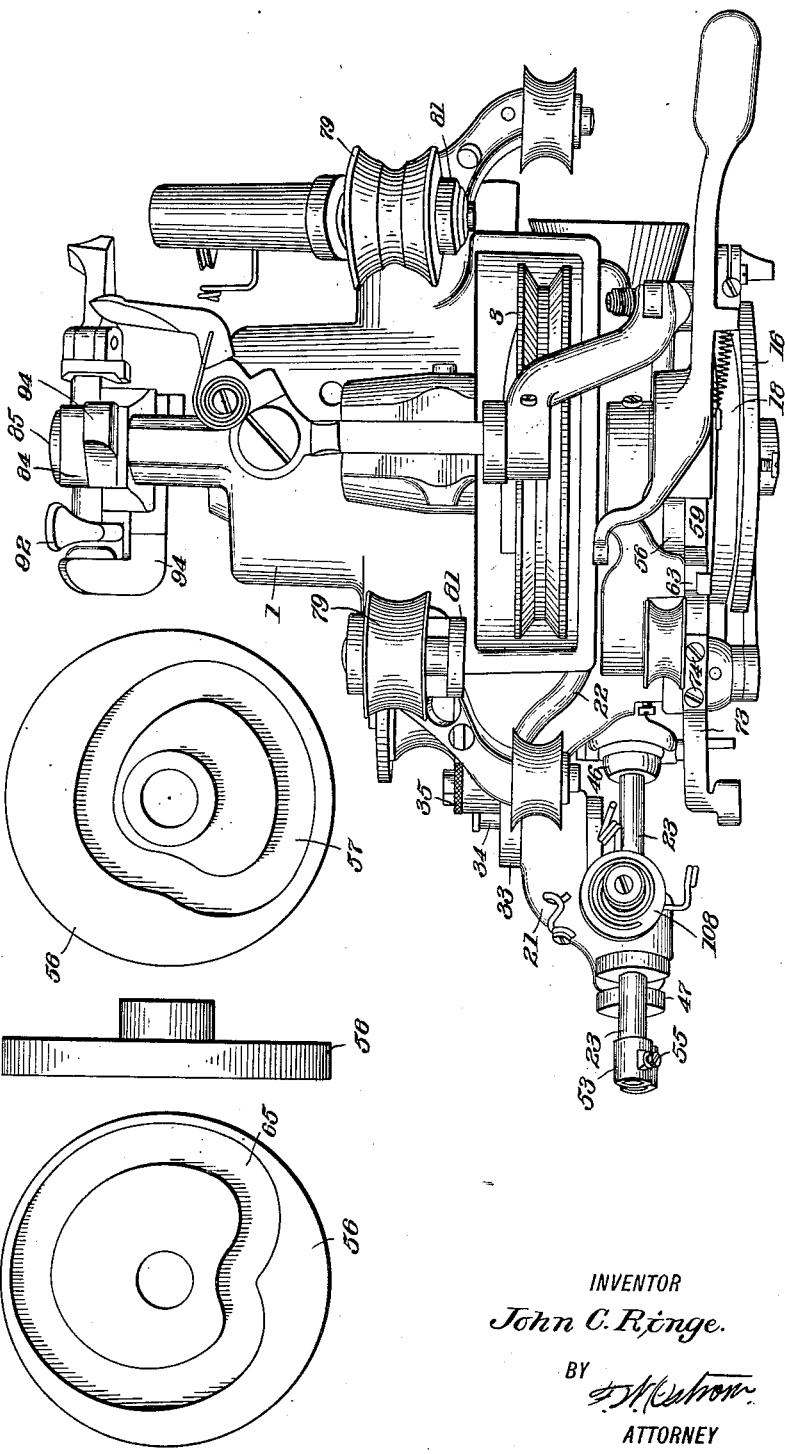

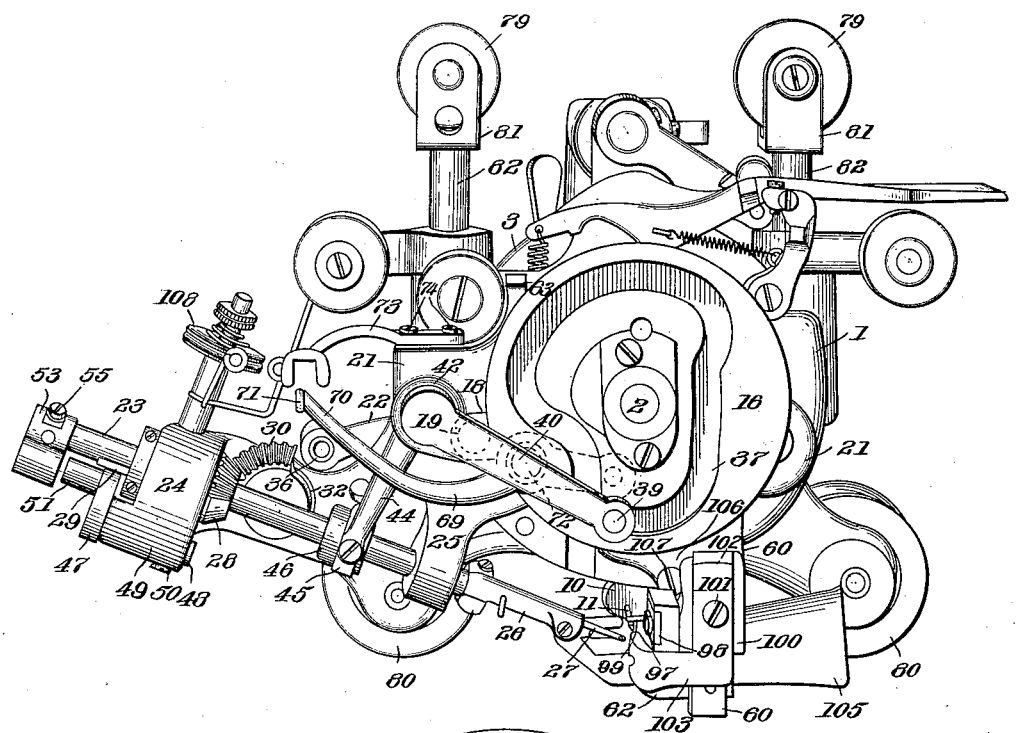

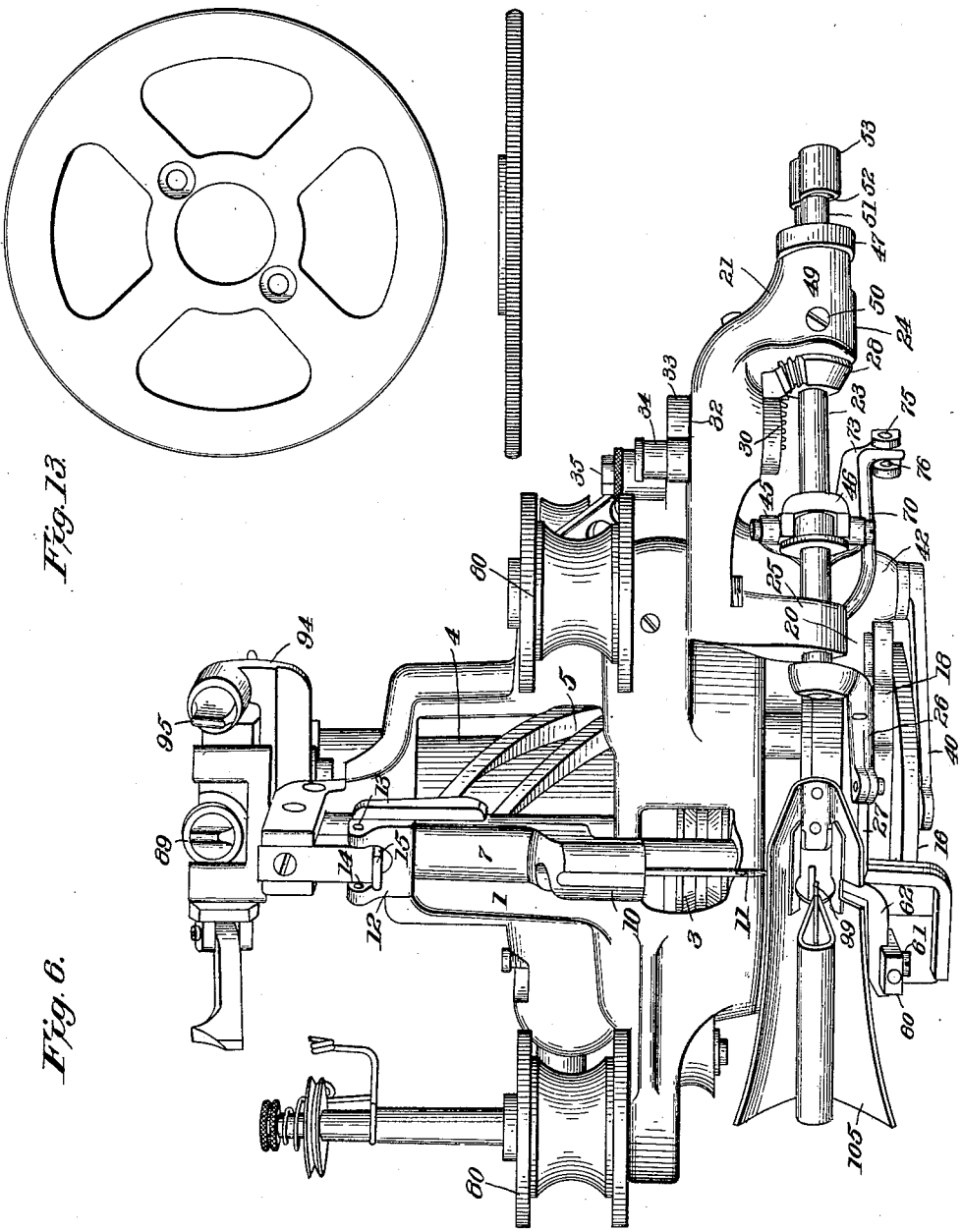

J. C. RINGE.
SEWING MACHINE.
APPLICATION FILED SEPT. 19, 1911.

1,100,913.

Patented June 23, 1914.

7 SHEETS—SHEET 7.

WITNESSES:
R. E. Fischer.
W. P. Stewart.

INVENTOR
John C. Ringe.
BY
F. N. Osborn
ATTORNEY.

UNITED STATES PATENT OFFICE.

JOHN C. RINGE, OF BRIDGEPORT, CONNECTICUT, ASSIGNOR TO THE SINGER MANUFACTURING COMPANY, A CORPORATION OF NEW JERSEY.

SEWING-MACHINE.

1,100,913.

Specification of Letters Patent.  Patented June 23, 1914.

Application filed September 19, 1911. Serial No. 650,142.

*To all whom it may concern:*

Be it known that I, JOHN C. RINGE, a citizen of the United States, residing at Bridgeport, in the county of Fairfield and State of Connecticut, have invented certain new and useful Improvements in Sewing-Machines, of which the following is a specification, reference being had therein to the accompanying drawings.

This invention relates to that class of sewing machines more particularly adapted for uniting sections of carpets or other heavy fabrics which are held stationary while the sewing machine is caused to travel or be fed along relative thereto, and has for its object to improve the construction represented by U. S. Patent No. 524,996, issued August 28, 1894 to E. B. Allen, by providing such construction with means for effecting either a through-and-through double chain-stitch seam or a double chain-stitch overedge seam.

When sewing together the selvage edges of fabrics the through-and-through stitch is sufficient to meet the requirements, as the abutting edges are protected against raveling, but when uniting raw edges it is essential that they be protected, which is the object of the double chain-stitch overedge seam; and in the manufacture of a given single product, such as carpets, it is often essential that the sewing machine employed be capable of effecting either seam, and without interfering with the concatenation of the stitches when changing the character of the seam.

Figures 14, 19:
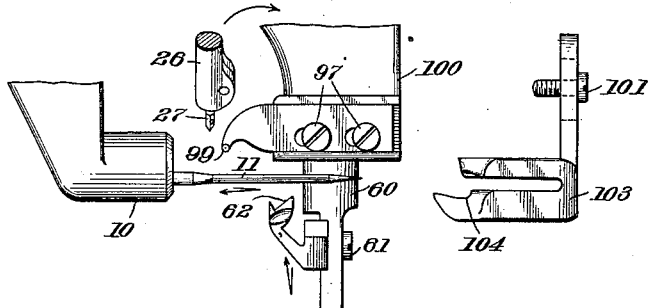

In the accompanying drawings illustrating the invention, in the several figures of which like parts are similarly designated, Figure 1 is a plan view of the machine represented by the previously referred to patent equipped with the present invention. Figs. 2 and 3 are front and rear side elevations, respectively, of Fig. 1. Figs. 4, 5 and 6 are rear end, front end, and underside views, respectively, of the previous figures. Fig. 7 is a front side elevation similar to Fig. 2, illustrating only such elements of the latter figure as are essential to an understanding of the construction and mounting of the loop-spreader cam disk. Fig. 8 represents the edge and reverse sides of the loop-spreader cam disk. Fig. 9 represents the edge and inner side of the looper-bar-actuating cam disk. Fig. 10 represents the edge and side of the looper-thread take-up lever. Fig. 11 represents the edge and side of the looper-bar-actuating yoke and the attached looper-bar-actuating lever. Fig. 12 is a perspective view of the loop-controller finger bracket and its integrally formed finger. Fig. 13 represents the front side and edge of the main shaft hand-actuating disk, which is of the same construction and possesses the same function as the like part in the device represented by the previously referred to patent. Figs. 14, 15, 16, 17 and 18 are views illustrating the relative action of the eye-pointed needle, eye-pointed looper and loop-spreader at different stages in the formation of the double chain-stitch overedge seam. Fig. 19 is a view in elevation of the needle-guard. Fig. 20 is a plan view of a portion of the double chain-stitch through-and-through seam and a portion of the continuously formed double chain-stitch overedge seam.

In describing the invention, only such limited reference will be made to the usual well known parts of the patented machine previously referred to as is deemed necessary for a proper understanding of the construction and application of the improvement.

1 denotes a metal frame in which is journaled a driving shaft 2 provided with a driving pulley 3 which is run by an endless belt, said pulley preferably having a suitable clutch connection with said shaft. To the shaft 2 is secured a cylinder 4 having a scroll cam-groove 5 entered by a pin or roller stud 6 on a needle-carrying slide 7 which is movable on guide rods 8 and 9 and has an arm or lug 10 to which the eye-pointed needle 11 is secured by a set screw or other suitable device. The slide 7 is provided with a block 12 having thread-eyes 13 and 14 arranged to pass on opposite sides of a stationary thread-stop 15 when the needle is withdrawn from the work, and thus said thread-stop, in connection with said thread-eyes from one to the other of which the thread runs on its way to the needle, serves as a positive take-up for the needle-thread, tightening the loops thereof when the needle is out of the work, as will hereinafter be more fully described.

To the shaft 2 is attached the looper-bar-actuating cam disk 16 provided at its inner side with a cam 17 which works in a horizontally movable looper-bar-actuating yoke 18 having formed integral with it a shaft 19 which passes through a suitable bearing 20 formed in the frame bracket 21, the shaft 19 carrying at its inner end a looper-bar oscillating lever 22.

23 represents a reciprocating looper-carrying bar which is mounted in bearings 24, 25, formed in the bracket 21, and carries at its forward end a looper-clamp 26 provided with an eye-pointed looper 27. In the bearing 24 of the bracket 21 is mounted an oscillating bevel gear 28 which is connected with the looper-carrying bar 23 by a key 29 secured in said bar and slidably connected with a suitable keyway formed in said bevel gear, thus permitting said bar to move in the direction of its length.

Contacting with the bevel gear 28 is a like gear 30 which is as two to one of the former and has formed integral with it a shaft 31 mounted in a bearing 32 formed in the bracket 21. The shaft 31 carries at its free end a crank 33 to which is pivotally attached one end of a link 34, its opposite end being threaded to receive a stud screw 35 provided with a non-threaded end 36 which enters a suitable opening in the looper-bar oscillating lever 22, thus oscillating movements are transmitted from the cam 17 to the looper-carrying bar 23.

In the face of the disk 16 opposite that carrying the cam portion 17 is formed a cam-groove 37 which coacts with a roller carried by a stud 39 secured in the cam-lever 40, the latter having formed integral with it a shaft mounted in a bearing 42 formed in the bracket 21, and upon said shaft is suitably secured the looper-vibrating lever 44 carrying at its lower end a rocking U-shaped yoke 45 which coacts with a grooved collar 46 carried by the looper-carrying bar 23, thus reciprocatory movements are transmitted to the bar 23 from the cam-groove 37 formed in the disk 16.

To insure that the looper-carrying bar will have reciprocatory movements in a given line when passing into the loop of the needle-thread, the bracket 21 is provided with a disk 47 carrying an integrally formed shaft 48 which is adjustably secured in a bearing 49 by screw 50, said disk being provided with a guide pin 51 which coacts with a suitable opening 52 formed in a bracket 53 secured by screw 55 to the looper-carrying bar 23.

To the shaft 2 is secured a loop-spreader cam disk 56 provided with a cam-groove 57 in which tracks a suitable roller 58 (shown in dotted lines only, Fig. 7) carried by a movable frame 59 having a depending arm 60 to the lower end of which is adjustably secured, by screw 61, the loop-spreader 62, said frame being slidably connected with bracket 21 by suitable grooves as 63 formed in the bracket 21. On the side of the disk 56 opposite that in which the groove 57 is formed is a cam-groove 65 in which tracks a roller 66 mounted upon a stud 67 carried by a short arm 68 of the looper-thread take-up lever 69 which is provided with a second arm 70 in the free end of which is formed a thread-eye 71, said take-up lever being fulcrumed upon a stud-screw 72 threaded into the frame 1.

73 represents a looper-thread bracket secured by screws as 74 to the bracket 21, the free end of the bracket 73 being provided with spaced thread-guides 75 and 76 which coact with the take-up lever 69 to control the looper-thread, as will later be explained.

The present machine, like that which is the subject of improvement, is fitted to run on a suitable track or guideway consisting, preferably, of suitable upper and lower rods, as 77 and 78, and is provided with upper grooved wheels, as 79, and lower grooved wheels, as 80, engaging said rods. The upper wheels 79 are carried by yokes, as 81, having shanks, as 82, fitted in suitable sockets formed in the frame 1, suitable coil springs (not shown) being placed in said sockets beneath said shanks to force the wheels 79 upward into yielding contact with said guide rods, as in the machine of the patent.

The feeding movements of the machine are effected by a feed-lever 84 pivoted near its upper end on the shank of a screw 85 received in a slot 86 at the upper end of said lever, and the shaft 2 is provided with an eccentric 87 which fits in an opening 88 in said lever, the latter being provided at its lower end with a tooth 89 to engage the teeth of a rack-bar 90 (shown in section only, Fig. 4) extending parallel to the guideways on which the machine runs. The tooth 89 is carried by a yoke 91 pivoted to the lever 84 so as to be adapted to be swung sidewise by the handle 92 to disengage the tooth 89 from the rack-bar 90 when it is desired to run the machine freely backward or forward on its guideway.

Coöperating with the feed-lever 84 is a holding bar 94 having at its lower end a tooth 95 which engages the teeth of the rack-bar 90, said bar 94 being slotted at its upper end for the passage of the screw 85 and provided with flanges 95′ between which works a cam 96 on the shaft 2, said cam serving to impart vertical reciprocatory movements to said bar, and said movements being in opposition to the vertical movements of the feed-lever 84, so that when the tooth 89 of the latter is in engagement with the rack-bar 90 and the feeding movement is occurring, the tooth 95 is lifted clear of said rack-bar, the said tooth 95 being in engagement with the rack-bar to hold the machine stationary when the tooth 89 of the feed-lever is lifted therefrom and said lever is making its backward or return movement. When the machine is stopped the holding bar 94 will be lifted so that when the feeding tooth is swung aside as above described, the machine will be free to run backward or forward, as may be desired. To the frame bracket 21 is adjustably secured by a screw, as 97, a loop-controller bracket 98 provided with a loop-controlling finger 99 which acts to assist in the formation of the looper-thread loop at the side of the fabric first to be pierced by the eye-pointed needle, as will later be explained.

To the depending portion 100 of the frame bracket 21 is secured by screw 101 and guideway 102 a needle-guard 103 provided with a curvilinear wall or notch 104 which assists in disengaging the looper-thread loop from the spreader 62 as the latter descends to its lowest position.

As the clutch mechanism for controlling the driving pulley and the stopping and starting mechanisms are the same as those represented by Figs. 7 and 8 (see paragraphs commencing with lines 52, 68 and 90, page 2), and the belt-gripping mechanism the same as that described in paragraph commencing with line 112, page 2, of the patent previously referred to, it has not been deemed necessary to herein refer in detail to the elements comprising such mechanisms.

In the use of the machine, the fabric sections to be united are held edgewise vertically by suitable clamps, and the fabric edges and pile are controlled and brought into proper position for the sewing operation by a suitable guide, as 105, removably secured to the bracket 106 secured to the frame 10 by screw 107.

Figure 15:
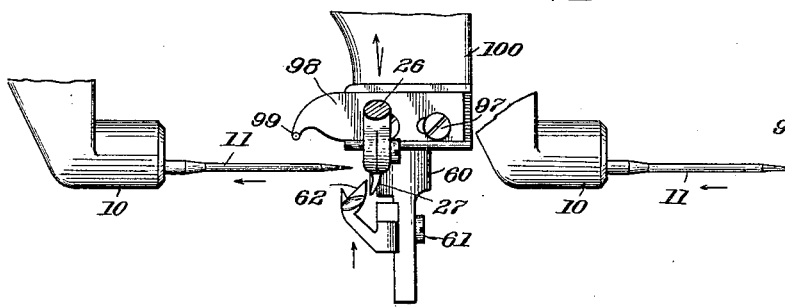
Figures 16, 17:
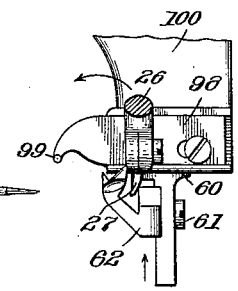
Figure 18:
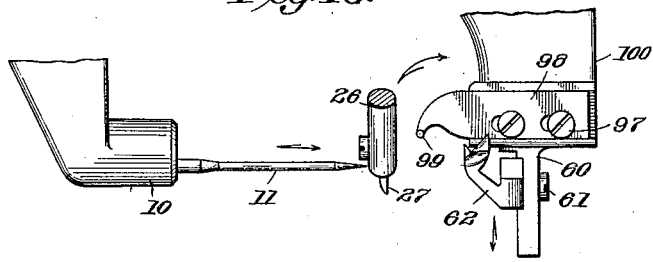

To effect the double chain-stitch overedge seam, the parts are operated and timed as follows:—The horizontally reciprocating needle 11, looper 27 and loop-spreader 62 are first advanced from the position shown in Fig. 18 to that shown in Fig. 14, the loop $a$ of the thread $b$ being carried by the needle through the loop $c$ of the thread $d$, through the fabric and through the loop $e$ of the latter thread, at which time the movements of the needle and loop-spreader are suspended until the looper is oscillated to the position shown in Fig. 15, when the looper carries the loop $e'$ (corresponding to the loop $e$) through the loop $a$, where it is held extended by the loop-spreader, the elements occupying the positions illustrated in Fig. 16, when the movement of the looper is suspended and the needle and spreader are moved to the positions shown in Fig. 17, at which time the movements of the spreader are suspended and the looper and needle advanced to their initial positions, Fig. 18; and in the oscillating movement of the looper from the position shown in Fig. 17 to its initial position, Fig. 18, the thread $d$ is carried over the finger 99 and across the edge of the fabric, said finger, in connection with the looper, acting to form the loop $c$ through which the loop $a$ is first carried. In the formation of the double chain-stitch overedge seam 109' just described, when the thread-carrying looper is withdrawing out of the needle loop in the formation of the loops $e$ and $e'$, the needle loop $a$ is tightened around the looper-thread loop by the action of the retreating needle, assisted by the take-up action of the eyes 13 and 14 and stop 15, as previously described; and during the oscillation of the looper from the rear to the front side of the fabric, the take-up lever 70 acts to tighten the thread $d$ between the fabric and the tension disk 108.

When it is desired to effect the through-and-through double chain-stitch seam 109 (Fig. 20), the stud screw 35 is withdrawn from the opening in the looper-bar-oscillating lever 22 and the end of the link 34 into which the stud screw 35 is threaded is swung down to a position to allow the non-threaded end 36 of said stud to enter an opening 110 formed in the frame bracket 21, which secures the looper-carrying bar in position to hold the thread-carrying looper at the front of the fabric, as illustrated in Fig. 2; and when so adjusted and held the looper-carrying bar, through its connection with the cam-groove 37, transmits to said looper movements substantially the same as those transmitted from the double cam $d$ to the thread-carrying looper $d^3$ of the patent above referred to (see column 1, page 3 of said patent), except that in order to avoid a change in the construction of the present cam-groove 37 to meet the requirements of the old seam, the looper-carrying bar is given one false movement in the direction of its length for each through-and-through double chain-stitch.

Claims:—

1. In a sewing machine for effecting a double chain-stitch overedge seam, the combination with a feeding mechanism of an eye-pointed thread-carrying needle and an eye-pointed thread-carrying looper, each adapted to pass its loop of thread through the loop of thread of said coacting thread-carrying element, a loop-spreader to hold the loop of looper-thread for the passage therethrough of the needle-thread loop, looper-actuating mechanism for imparting to the thread-carrying looper movements from one side of the fabric position to the opposite side thereof and further movements axially of the looper in directions transverse to said former movements to form loops of looper-thread at opposite sides of the fabric, and actuating means, substantially as described, for giving to said eye-pointed needle, eye-pointed thread-carrying looper and loop-spreader movements for effecting substantially the character of double chain-stitch overedge seam described.

2. In a sewing machine, the combination with a feeding mechanism of an eye-pointed thread-carrying needle and an eye-pointed thread-carrying looper, each adapted to pass its loop of thread through the loop of thread carried by said coacting thread-carrying element, a loop-spreader to hold the loop of looper-thread for the passage therethrough of the needle-thread loop, actuating mechanism for imparting to the thread-carrying looper movements, to form loops of looper-thread at one and at both sides of the fabric, and actuating means, substantially as described, for giving to said eye-pointed thread-carrying needle, eye-pointed thread-carrying looper and loop-spreader movements to form stitches, said actuating means including an adjustable element for changing the operative relationship of the eye-pointed thread-carrying looper-actuating mechanism with respect to said mechanism for actuating the eye-pointed thread-carrying needle and loop spreader, to form stitches of different character.

3. In a sewing machine for effecting a double chain-stitch overedge seam, the combination with a feeding mechanism of a thread-carrying needle, a looper-carrier and a looper, said thread-carrying needle and a looper each adapted to pass its loop of thread through the loop of thread of said coacting thread-carrying element, a loop-spreader to hold the loop of looper thread for the passage therethrough of the needle-thread loop, looper-actuating mechanism including gears for imparting to the thread-carrying looper movements from one side of the fabric position to the opposite side thereof and further movements axially of the looper in directions transverse to said former movements to form loops of looper thread at opposite sides of the fabric, and actuating mechanism, for giving to said thread-carrying needle, looper-carrier, looper and loop-spreader movements for effecting substantially the character of double chain-stitch overedge seam described.

4. In a sewing machine for effecting a double chain-stitch overedge seam, the combination with a feeding mechanism of a thread-carrying needle, a looper-carrier and a looper, said thread-carrying needle and looper each adapted to pass its loop of thread through the loop of thread of said coacting thread-carrying element, a loop-spreader to hold the loop of looper-thread for the passage therethrough of the needle-thread loop, looper-actuating mechanism including gears of the ratio of two to one for imparting to the thread-carrying looper movements from one side of the fabric position to the opposite side thereof and further movements axially of the looper in directions transverse to said former movements to form loops of looper thread at opposite sides of the fabric, and actuating mechanism for giving to said thread-carrying needle, looper-carrier, looper and loop-spreader movements for effecting substantially the character of double chain-stitch overedge seam described.

5. In a sewing machine, the combination of a feeding mechanism of a thread-carrying needle and a thread-carrying looper each adapted to pass its loop of thread through the loop of thread carried by said coacting thread-carrying element, a loop-spreader to hold the loop of looper-thread for the passage therethrough of the needle-thread loop, an element carried by a stationary part of the sewing machine to displace the loop of looper-thread from engagement with said loop-spreader as the latter is moved downward below the line of seam formation, said looper being adapted to form thread loops at both the outer and inner sides of the fabric, and actuating means, substantially as described, for giving to said thread-carrying needle, thread-carrying looper and loop-spreader movements to form stitches.

6. In a sewing machine, the combination with a feeding mechanism of a thread-carrying needle and a thread-carrying looper each adapted to pass its loop of thread through the loop of thread carried by said coacting thread-carrying element, and a loop-spreader to hold the loop of looper-thread for the passage therethrough of the needle-thread loop, said looper being adapted to form thread loops at both the outer and inner sides of the fabric, and actuating means, substantially as described, for giving to said thread-carrying needle, thread-carrying looper and loop-spreader movements to form stitches, said looper in its travel from the outer to the inner side of the fabric to form said inner loop carrying said looper-thread over and upon a stationary finger to hold the latter loop for the entrance of said thread-carrying needle in its movements to pierce said fabric.

7. In a sewing machine, the combination with a feeding mechanism of a thread-carrying needle and a thread-carrying looper each adapted to pass its loop of thread through the loop of thread carried by said coacting thread-carrying element, a loop-spreader to hold the loop of looper-thread for the passage therethrough of the needle-thread loop, an element carried by a stationary part of the sewing machine to displace the loop of looper thread from engagement with said loop-spreader as the latter is moved downward below the line of seam formation, said looper being adapted to form thread loops at both the outer and inner sides of the fabric, and in its travel from the outer to the inner side of the fabric to form said inner loop carrying said looper-thread over and upon a stationary finger to prepare the latter loop for the entrance of said thread-carrying needle in its movements to pierce the fabric, and actuating means, substantially as described, for giving to said thread-carrying needle, thread-carrying looper and loop-spreader movements to form stitches.

8. In a sewing machine for effecting a double chain-stitch overedge seam, the combination with a feeding mechanism of a thread-carrying needle, a looper-carrier and a looper, said thread-carrying needle and looper each adapted to pass its loop of thread through the loop of thread of said coacting thread-carrying element, a loop-spreader to hold the loop of looper-thread for the passage therethrough of the needle-thread loop, said looper being adapted to move in directions inclined to the direction of the seam and axially in directions transverse to said inclined movements to form loops of looper-thread at opposite sides of the fabric, and actuating means including gears, one of which is carried by said looper-carrier, for giving to said thread-carrying needle, looper-carrier, looper and loop-spreader movements for effecting substantially the character of double chain-stitch overedge seam described.

In testimony whereof, I have signed my name to this specification, in the presence of two subscribing witnesses.

JOHN C. RINGE.

Witnesses:
ABBIE M. DONIHEE,
THOMAS CAMPBELL.

---

Copies of this patent may be obtained for five cents each, by addressing the "Commissioner of Patents, Washington, D. C."